US008419199B2

(12) United States Patent
Mueller et al.

(10) Patent No.: US 8,419,199 B2
(45) Date of Patent: Apr. 16, 2013

(54) MIRROR HEAD FOR A REARVIEW MIRROR, PREFERABLY AN EXTERIOR REARVIEW MIRROR

(75) Inventors: Dirk Mueller, Stuttgart (DE); Juergen Tilg, Weinsberg (DE); Thomas Scheunpflug, Winnenden (DE); Kuersat Sonntag, Kettershausen (DE); Arne Schmierer, Kircheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 700 days.

(21) Appl. No.: 11/993,790

(22) PCT Filed: May 30, 2006

(86) PCT No.: PCT/EP2006/005121
§ 371 (c)(1),
(2), (4) Date: Apr. 28, 2010

(87) PCT Pub. No.: WO2007/000221
PCT Pub. Date: Jan. 4, 2007

(65) Prior Publication Data
US 2010/0202074 A1    Aug. 12, 2010

(30) Foreign Application Priority Data
Jun. 27, 2005    (DE) .......................... 10 2005 031 078

(51) Int. Cl.
*G02B 7/182* (2006.01)
(52) U.S. Cl.
USPC .......................................... 359/872

(58) Field of Classification Search .................. 359/841, 359/871, 872, 877, 878, 879, 880
See application file for complete search history.

(56) References Cited

U.S. PATENT DOCUMENTS

| 4,470,323 A | 9/1984 | Manzoni |
| 5,245,480 A | 9/1993 | Polzer |
| 5,781,353 A * | 7/1998 | Seubert et al. ................. 359/841 |
| 6,109,586 A | 8/2000 | Hoek |
| 7,384,162 B2 * | 6/2008 | Shinohara ..................... 359/841 |

FOREIGN PATENT DOCUMENTS

| DE | 101 21 400 A1 | 11/2002 |
| DE | 101 22 399 | 11/2002 |
| FR | 1 378 991 A | 11/1964 |

OTHER PUBLICATIONS

Written Opinion of the International Searching Authority for PCT/EP2006/005121.

* cited by examiner

*Primary Examiner* — Euncha Cherry
(74) *Attorney, Agent, or Firm* — Reising Ethington PC

(57) ABSTRACT

The invention relates to a mirror head for an exterior rear view mirror for motor vehicles, comprising a mirror housing, which is fixed to the mirror support. To minimize vibrations caused by the force of the wind or similar, the mirror housing has a partial flexibility in relation to the mirror support. By subjecting the mirror housing to an appropriate force, said housing can be displaced in relation to the mirror support. A flexible connection between the mirror housing and the mirror support permits the vibrations at least to be minimized. The mirror head is designed for use as an exterior rear view mirror for motor vehicles.

9 Claims, 7 Drawing Sheets

MIRROR HEAD FOR A REARVIEW MIRROR, PREFERABLY AN EXTERIOR REARVIEW MIRROR

BACKGROUND OF THE INVENTION

The invention is based on a priority patent application DE 10 2005 031 078.8 which is hereby incorporated by reference.

The invention relates to a mirror head for a rearview mirror, preferably an exterior rearview mirror of a vehicle comprising a mirror housing, connected to a mirror support at least at one mounting point in a solid manner, wherein the mirror housing comprises a mounting component, protruding from its rear wall in the area of the mounting point, wherein the mounting component is configured to receive at least one connection element, wherein the mirror housing has at least one degree of freedom for its movement relative to the mirror support.

In known rearview mirrors, the mirror housing is connected solid with the mirror support. While driving, substantial wind forces can affect the mirror head, leading to vibrations of the mirror head.

The invention is based on the object to provide the mirror head of this kind, so that the vibration excitation through wind loads and similar is minimized.

SUMMARY OF THE INVENTION

This object is accomplished at the mirror head of this kind, according to the invention, through a mirror housing, connected to a mirror support at least at one mounting point in a solid manner, wherein the mirror housing comprises a mounting component, protruding from its rear wall in the area of the mounting point, wherein the mounting component is configured to receive at least one connection element, wherein the mirror housing has at least one degree of freedom for its movement relative to the mirror support.

In the embodiment of the mirror head, according to the invention, the mirror housing is not connected to the mirror support in a rigid manner, but at least partially movable within limits. With respective force loading, therefore, the mirror housing can at least partially perform movements relative to the mirror support. Through this flexible connection of the mirror housing with the mirror support, the vibration excitation, as it is given e.g. by wind forces, is at least partially minimized.

In an advantageous embodiment, the mirror housing can be at least partially deformed elastically. In this case, the mounting area of the mirror housing at the mirror support can be provided rigid. The movement of the mirror housing, relative to the mirror support, is then accomplished through the mirror housing being elastically deformed.

In another advantageous embodiment, the mirror housing is disposed at least partially flexible, relative to the mirror carrier. In this case, the entire mirror housing can perform movements relative to the mirror carrier. The connection of the mirror housing to the mirror support is performed in this case by means of an elastic, resilient connection.

It is sufficient, when the mirror housing is connected with the mirror support in at least one mounting point.

The mirror housing advantageously comprises a mounting component in the area of the mounting point, wherein said mounting component protrudes from its backside wall, and is being used for receiving at least one connection element.

The connection element of the mirror housing is provided as a protrusion in an advantageous manner, laterally protruding from the inner side of the rear wall of the mirror housing, wherein said protrusion is advantageously integrally formed with the mirror housing.

In order to achieve the limited movement of the mirror housing, this mounting component can be elastically bendable. In this case, the mounting components bend elastically when respective forces occur, whereby the mirror housing is movable within limits, relative to the mirror carrier.

In a useful manner, the mounting component of the mirror housing is provided at least partially sleeve shaped. Thereby, the connection element can be received very easily by the mounting component.

A particularly good elastic bendability of the mounting component of the mirror housing is possible, when it comprises at least one contraction. Due to the cross section reduction thereby achieved, a targeted elastic bendability of the mounting component is accomplished.

In an advantageous embodiment, the connection element, by which the mirror housing and the mirror support are connected amongst each other, is a screw, which is screwed into the front face of the mounting component of the mirror housing.

The connection element is advantageously located within a mounting component of the mirror support. Thereby, the connection element is housed within the mirror head in a protected manner.

In an advantageous manner, the mounting component on the side of the mirror support is provided sleeve shaped. The connection element can be housed within this sleeve section in a protected manner.

The mounting component on the side of the mirror support advantageously comprises a bottom at its end, facing the rear wall of the mirror housing, which is provided with a pass-through opening for the pass-through of the connection element. The connection element can be mounted from the inner side of the mounting component on the side of the mirror support, and can be connected with the mounting component on the side of the mirror housing.

A proper alignment of the mirror housing, relative to the mirror support, at least in the mounting section, is preferably accomplished by the mounting component on the side of the mirror housing contacting the bottom of the mounting component on the side of the mirror support.

In case the connection element is a screw, its head contacts the bottom of the mounting component on the side of the mirror support in an advantageous manner. Thereby, simple assembly is assured, since the screw is simply screwed in, until its head contacts the bottom. By means of the screw, the mounting component on the side of the mirror housing is brought into contact with the bottom of the mounting component on the side of the mirror support.

In an advantageous manner, the mirror housing contacts the mirror support under a preload. This preload can be accomplished by the head of the screw being disposed at a distance from the bottom of the mounting component on the side of the mirror support, and by the screw being surrounded by at least one preload element in the section between the bottom and its head. This provides that the mounting component on the side of the mirror housing is pulled against the floor of the mounting component with a respective force.

The preload element can be a compression coil spring, or an elastically deformable sleeve, which sits on the screw.

For the movement of the mirror housing, relative to the mirror carrier, it is sufficient when substantially only one degree of freedom is provided. In this case, the mirror housing moves relative to the mirror support substantially only in one direction. Herein the movement axis can be disposed approximately transversal to the driving direction of the vehicle, at which the mirror head is mounted. Thus the moving axis extends approximately in the direction of the width of the mirror housing, relative to the mirror housing. If this imaginary moving axis is disposed in the direction of the width of the mirror housing, it moves in driving direction of the vehicle in a forward direction relative to the mirror support. However, if this imaginary moving axis is inclined relative to the direction of the width of the mirror housing, and slightly inclined relative to the height direction, the mirror housing is not only moved forward in driving direction, but also simultaneously upwards at a slanted angle, relative to the mirror support. In an advantageous manner, in this case, the imaginary moving axis is disposed, so that the mirror housing approaches the vehicle during its movement.

But the mirror housing can also be connected to the mirror support, so that several degrees of freedom are available for the movement of the mirror housing. It is hereby advantageous, when the mounting location is provided like a ball joint. Depending on the direction of the force acting upon the mirror housing, the mirror housing can be moved in different directions relative to the mirror carrier.

The connection element, by which the mirror support and the mirror housing are connected amongst each other, in this case, is advantageously provided with a ball head, which is received in a ball socket of the mounting component on the side of the mirror housing. The shape of the connection element and of the mounting component on the side of the mirror housing furthermore facilitates simple assembly.

In an advantageous manner, the mounting location is off center relative to the width extension of the mirror housing, and advantageously close to the bottom of the mirror housing.

Additional features of the invention can be derived from the additional claims, the description, and the figures.

BRIEF DESCRIPTION OF THE DRAWINGS

The invention is described in more detail with reference to a few embodiments illustrated in the figures. It is shown in.

DETAILED DESCRIPTION OF THE DRAWINGS

Figure 1:
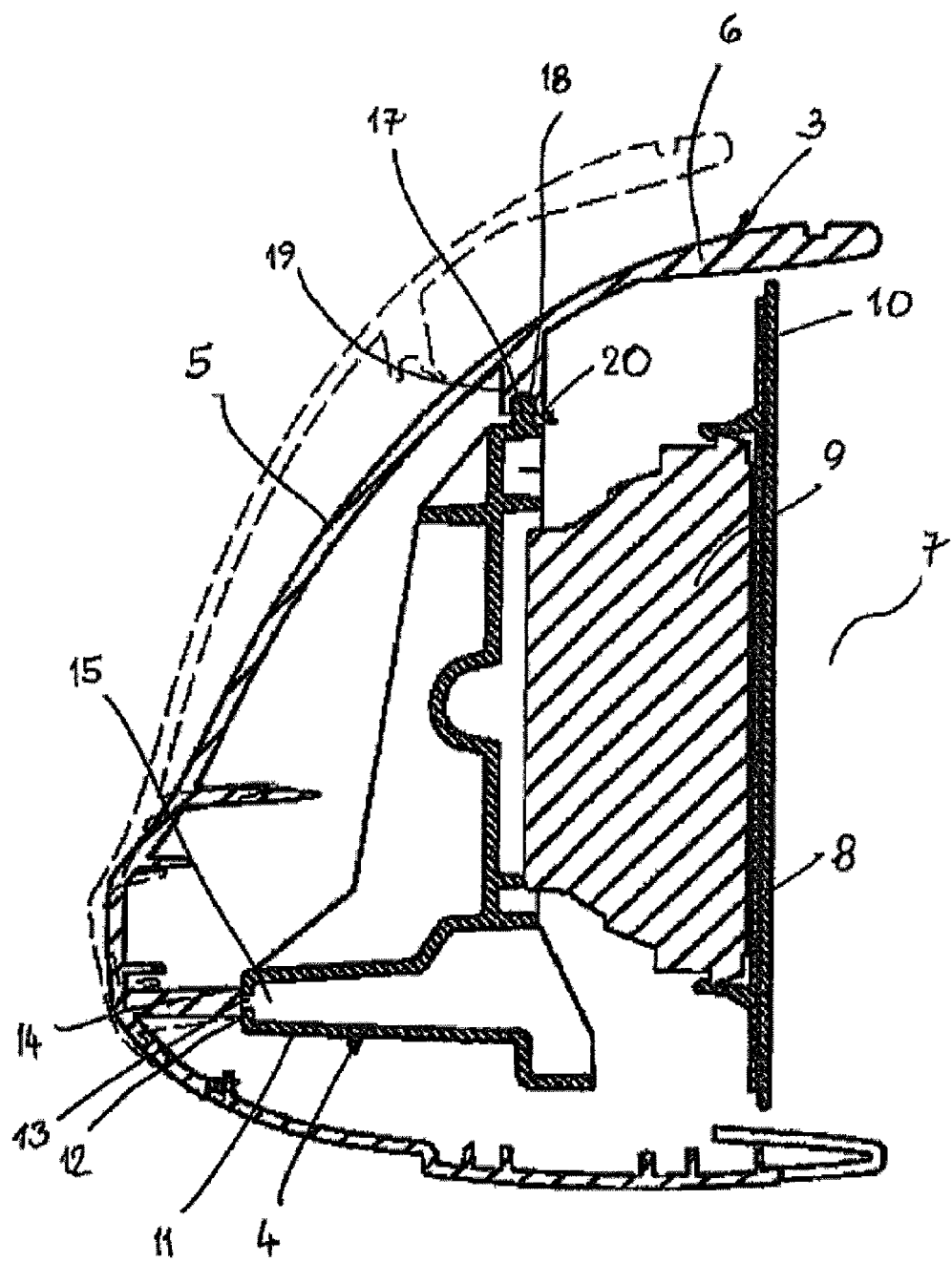
FIG. 1 a first embodiment of a mirror head of an exterior rearview mirror, according to the invention, in a sectional view.

The exterior rearview mirror is provided for vehicles, in particular for motor vehicles, and comprises a mirror base 1 (FIG. 2), by means of which the exterior rearview mirror is mounted to the vehicle. The mirror base 1 can be made of metal or plastic, which can be colored in the color of the vehicle, or provided with a respective coat of paint, preferably a coat of lacquer. A mirror head 2 is supported at the mirror base 1, which can be pivoted from the use position shown in FIG. 2 in and against driving direction relative to the mirror base 1. When the mirror head 2 is pivoted backwards in driving direction relative to the mirror base 1, it is adjusted from the illustrated use position into a parking position, in which the mirror head 2 is located at the side of the vehicle. The mirror head 2 can be pivoted forward in driving direction relative to the mirror base 1, e.g. when it is hit by a jolt. In this case, the mirror head 2 is pivoted against a reversing force, preferably a spring force. As soon as the force loading on the mirror head 2 stops, the mirror head 2 can thereby pivot back into its use position.

The mirror head 2 comprises a mirror housing 3, which is held at a mirror support 4. The mirror housing 3 is preferably made of plastic, which is preferably colored, preferably in the color of the vehicle. However, the mirror housing 3 can also be provided with a respective coat of paint, preferably with a coat of lacquer. It is also possible to provide the mirror housing 3 in a neutral color, e.g. in a black or white color tone. The mirror housing 3 has a rear wall 5, which transitions into a circumferential side wall 6, enclosing an opening 7, which is opposed at a distance relative to the rear wall 5. A mirror glass 8 is disposed in the opening 7, which can be adjusted with an adjustment drive 9. The mirror glass 8 is mounted to a mirror glass supportplate 10, which in turn is mounted to an adjustment drive 9, preferably snapped in. The mirror glass 8 can preferably be heated and can be provided as an EC glass, which dims, when it is impacted by the lights of subsequent vehicles, thereby avoiding blinding the driver of the motor vehicle.

The mirror support 4 comprises a holder portion 11, protruding towards the rear wall 5 of the mirror housing 3, which is provided as hollow body, and which protrudes in the direction of the rear wall 5 of the mirror housing 3. The holder component 11 is open at its side, facing the mirror glass 8. As shown in FIG. 1, the holder component is disposed at a small distance to the lower portion of the side wall 6 in the use position of the mirror head 2. The end of the holder component 11, facing the rear wall 5 of the mirror housing 3, is closed by a bottom 12, in which a pass-through opening 13 for a connection element, preferably a screw, is disposed. This connection element can be mounted from the open side of the holder component 11 with a respective tool.

Figure 2:
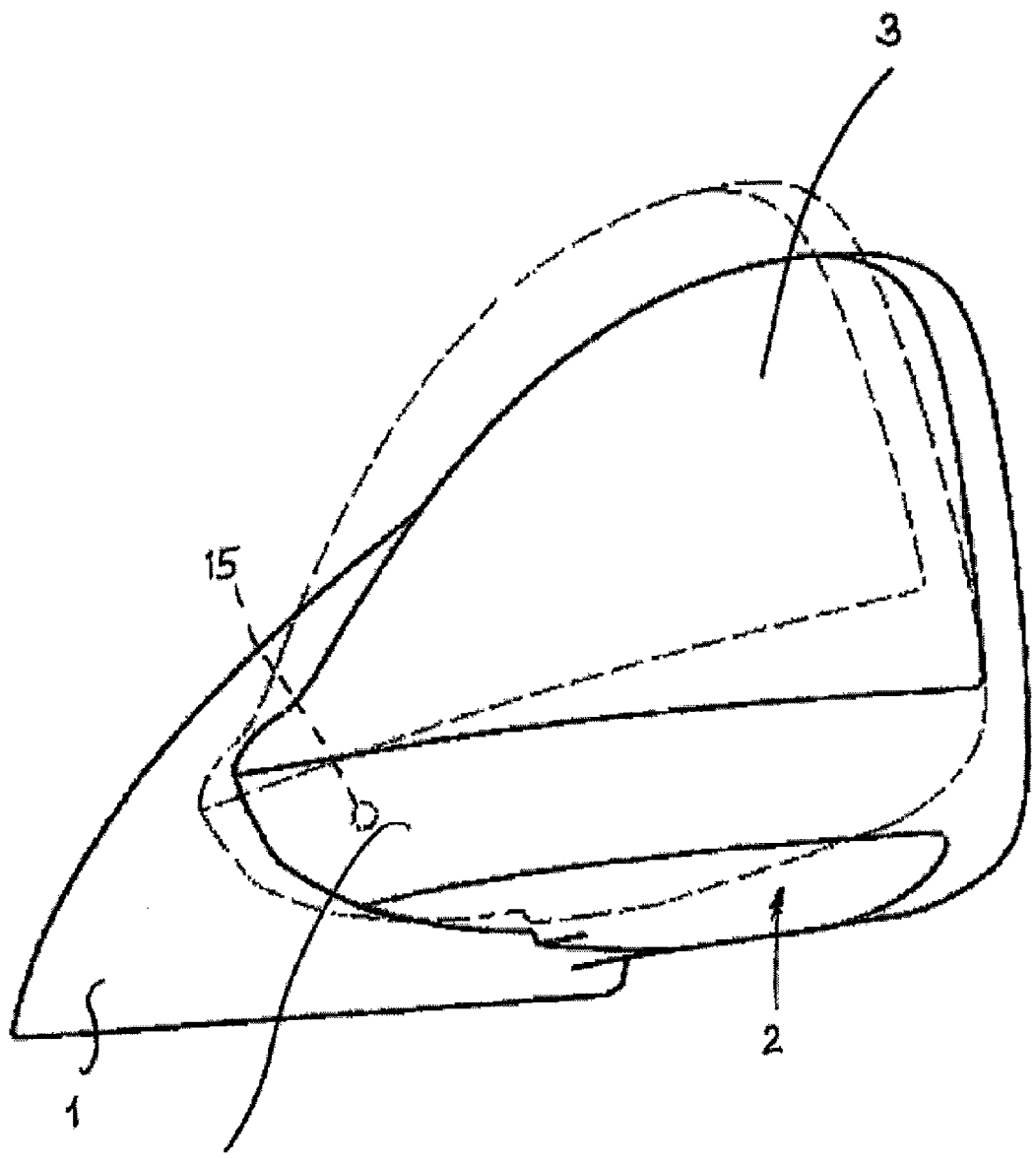
FIG. 2 the exterior rearview mirror with the mirror head according to the invention viewed from behind.

The mirror housing 3 comprises a protrusion 14 at the elevation of the holder component 11, wherein said protrusion is integrally connected with the rear wall 5 of the mirror housing 3. The protrusion 14 is long enough, so that the bottom 12 of the holder component 11 abuts in mounted position to the face side of the protrusion 14. The connecting element, preferably the screw, is inserted into the protrusion 14. This way, the mirror housing 3 is connected with the mirror support 4. The holder component 11 and the protrusion 14 in combination with the connection element form a mounting point 15 for the mirror housing 3. In FIG. 2, the section 16 is shown, wherein this mounting point 15 can be disposed. It is the only point, at which the mirror housing 3 is connected solid with the mirror support 4. The mounting section 16 can extend from the mirror base 1 to the end of the mirror head 3, which is remote from the motor vehicle.

The protrusion 14 and/or the holder component 11 are provided, so that when a force impacts the mirror housing 3 from the mirror glass side, the mirror housing 3 can elastically recede relative to the mirror support 4. In FIGS. 1 and 2, this extended position of the mirror housing 3 relative to the mirror support 4 is illustrated by a broken line. The mounting point 15 is provided sufficiently flexible, so that the mirror housing 3 can be elastically deformed relative to the mirror support 4 without any problems. In the embodiment according to FIG. 1, this is accomplished by the protrusion 14 of the mirror housing 3 being provided elastically bendable, so that in case of a respective force impact, this protrusion 14 can bend elastically. After the termination of the force impact, the mirror housing 3 springs back into the starting position.

In order for the mirror housing 3 to be held properly at the mirror support 4, the mirror support 4 is provided with at least one protrusion 17, engaging in a form locking manner into an indentation 18, which is provided in the front face of a protrusion 19, protruding from the inside of the rear wall 5. The mirror supportprotrusion 17 advantageously comprises a front face, which is curved in cross section. Accordingly, the bottom of the indentation 18 is provided curved. The protrusion 17 can be provided as a bar, so that it extends transversal to the driving direction along at least a section of the mirror support 4. But, it is also possible to provide several such protrusions 17 along the length of the mirror support 4, which are associated with respective protrusions 19 of the mirror housing 3. In order for the protrusion 19 to reliably reach the protrusion 17 after spring back, the protrusion 19 of the mirror housing 3 is provided with a slanted protrusion 20 at the side facing the mirror glass 8, wherein said protrusion 20 provides an insertion support during the spring back of the mirror housing 3. Thus, it is assured in connection with the curved front face of protrusion 17 on the mirror support side that the form locked connection between the mirror housing 3 and the mirror support 4 is safely reached. This form locked connection assures that in spite of the mounting of the mirror housing 3 through only one mounting point 15 at the mirror support 4 the mirror housing 3 is safely connected to the mirror support 4.

As it becomes evident from FIG. 2, the mirror housing 3 does not only pivot forward in driving direction, but also in an upward slanted direction towards the motor vehicle (not shown). This is accomplished by the mounting point 15 being provided closer to the mirror base 1, than to the rim of the mirror head, or the mirror housing, which are remote from the motor vehicle, and by the imaginary pivot axis being disposed transversal to the driving direction, or approximately in width direction of the mirror housing 3.

During flexible deformation, substantially only the portion of the mirror housing 3, which is disposed above the mounting point 15, is elastically deformed, while the section, located in the area below the mounting point 15, substantially maintains its position. Thereby, it is possible, e.g. to produce this lower section of the mirror housing 3 from elastically non resilient material, and to manufacture only the portion located above the mounting point 15 from an accordingly resilient elastic material. This has the advantage that e.g. installation components can be mounted in the stiff lower portion of the mirror housing 3, like e.g. light elements and associated circuit boards, cameras, GPS modules, or similar.

The mirror housing 3 can also be connected to the mirror support 4 by more than one mounting point 15. In this case, the position of the mounting points 15 is selected, so that the mirror housing 3 can perform a relative motion, relative to the mirror support 4 through elastic deformation in the described manner during force impact.

Due to the flexible connection of the mirror housing 3 with the mirror support 4, the vibration excitation through wind and similar is minimized, since a significant decoupling effect is reached, whereby the excitation forces leading to vibrations are almost avoided.

Figure 3:
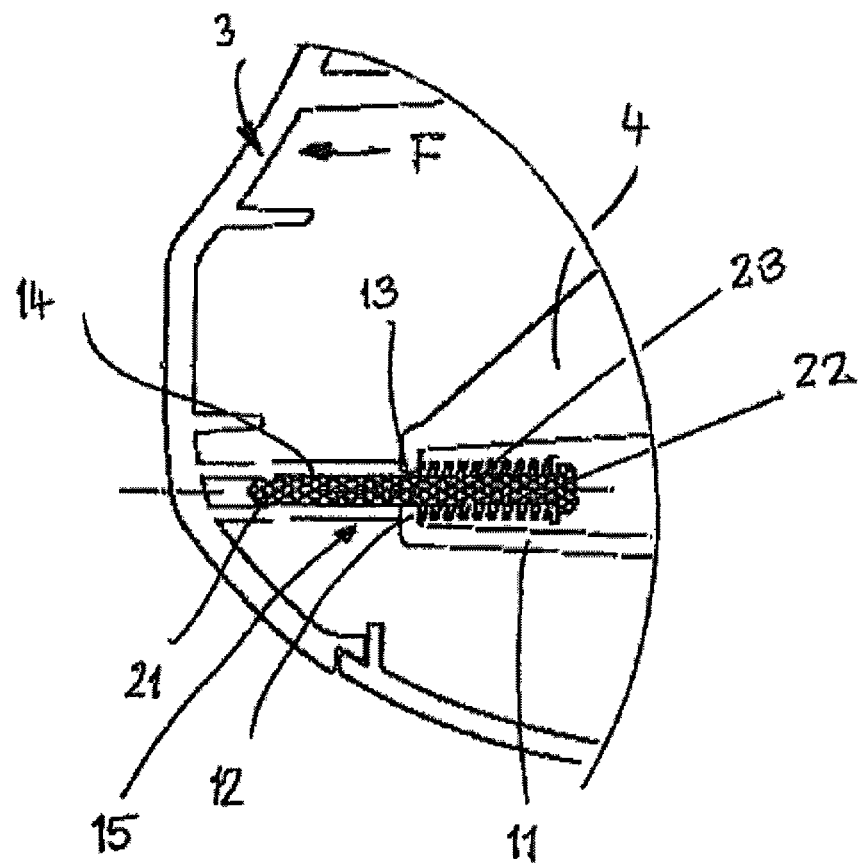
FIG. 3 another embodiment of a mirror head according to the invention in a partial sectional view.

FIG. 3 shows an embodiment of a connection of the mirror housing 3 to the mirror support 4. A screw 21 is screwed into the protrusion 14 of the mirror housing 3, which is provided as a hollow body, wherein said screw reaches through the opening 13 in the bottom 12 of the holder component 11. The head 22 of the screw 21 is disposed within the holder component 11 at distance from the bottom 12. In the portion between the bottom 12 and the head 22, the screw 21 is surrounded by a compression spring 23. It is preloaded in the illustrated installed position, so that the protrusion 14 is pulled tight against the bottom 12 of the holder component 11. If a force F is imparted upon the mirror housing 3, the mirror housing 3 is elastically deformed at least in the section above the mounting point 15. Herein, the protrusion 14 lifts off from the bottom 12 of the holder component 11. The screw 22 reaches through the opening 13 in the bottom 12 with a sufficient clearance, so that the screw does not hit the rim of the pass-through opening 13 during an evasive movement of the mirror housing 3. The compression spring 23 assures that the mirror housing 3 flexes back into its initial position after termination of the force impact. In this embodiment, the protrusion 14 does not have to be elastically deformable. It is even possible that the entire mirror housing 3 is provided so it maintains its shape, since the described configuration of the mounting point 15 allows a pivoting motion of the mirror housing 3 relative to the mirror support 4.

Figure 4:
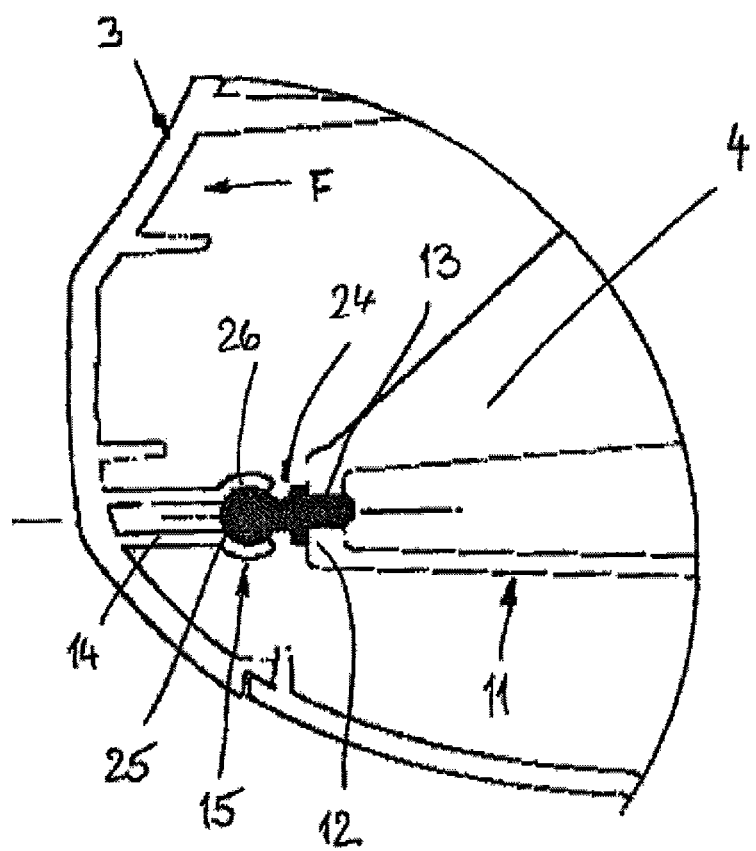
FIG. 4 another embodiment of a mirror head according to the invention in an illustration according to FIG. 3.

In the embodiment according to FIG. 4, the connection between the mirror housing 3 and the mirror support 4 is performed by a ball element 24 with a ball head 25, which is received in a ball socket 26. It is provided at the free end of the protrusion 15 of the mirror housing 3. The ball element 24 is mounted in the pass-through opening 13 in the bottom 12 of the holder component 11. Due to the ball head configuration of the mounting element 15, the mirror housing 3 cannot only be adjusted in one direction relative to the mirror support 4, but in several directions. Depending on the direction of the effective force F, the mirror housing 3 is elastically deformed relative to the mirror support 4. Thereby the protrusion 14 can be provided in a stable form. When the force is imparted, the protrusion 14 pivots with its ball socket 26 on the ball head 25. The mirror housing 3 can also be provided overall with a stiff shape. The ball joint connection to the mirror support 4, however still allows a relative pivoting of the mirror housing 3, relative to the mirror base 4, when the force is imparted.

Figure 5:
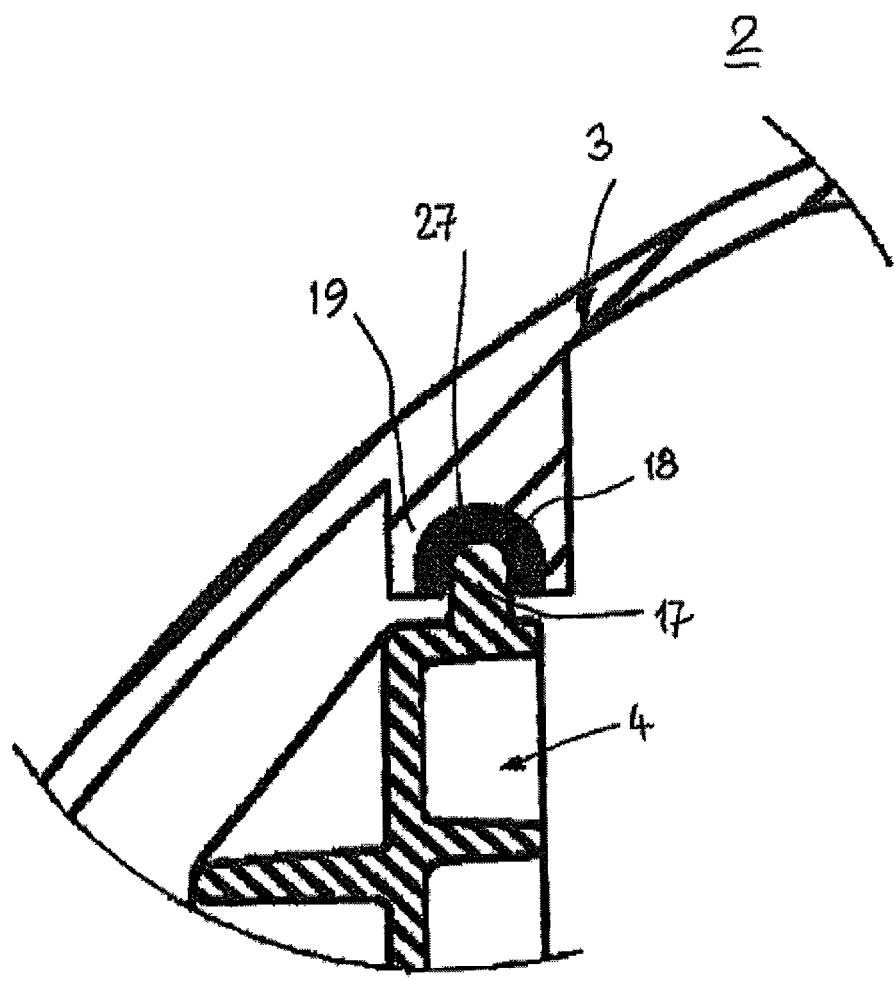
FIG. 5 another embodiment of a mirror head according to the invention in an illustration according to FIG. 3.

FIG. 5 shows another embodiment of the form locked connection between the mirror housing 3 and the mirror support 4 in the portion of the mirror head 2, which is on top in the use position. The protrusion 19 comprises the front side indentation 18, into which the protrusion 17 of the mirror support 4 engages in a form locking manner. The bottom of the indentation 18 can be provided with a damping liner 27, so that the form locked connection between the mirror housing 3 and the mirror support 4 is additionally attenuated, which counteracts vibration excitations through wind forces or similar.

Figure 6:
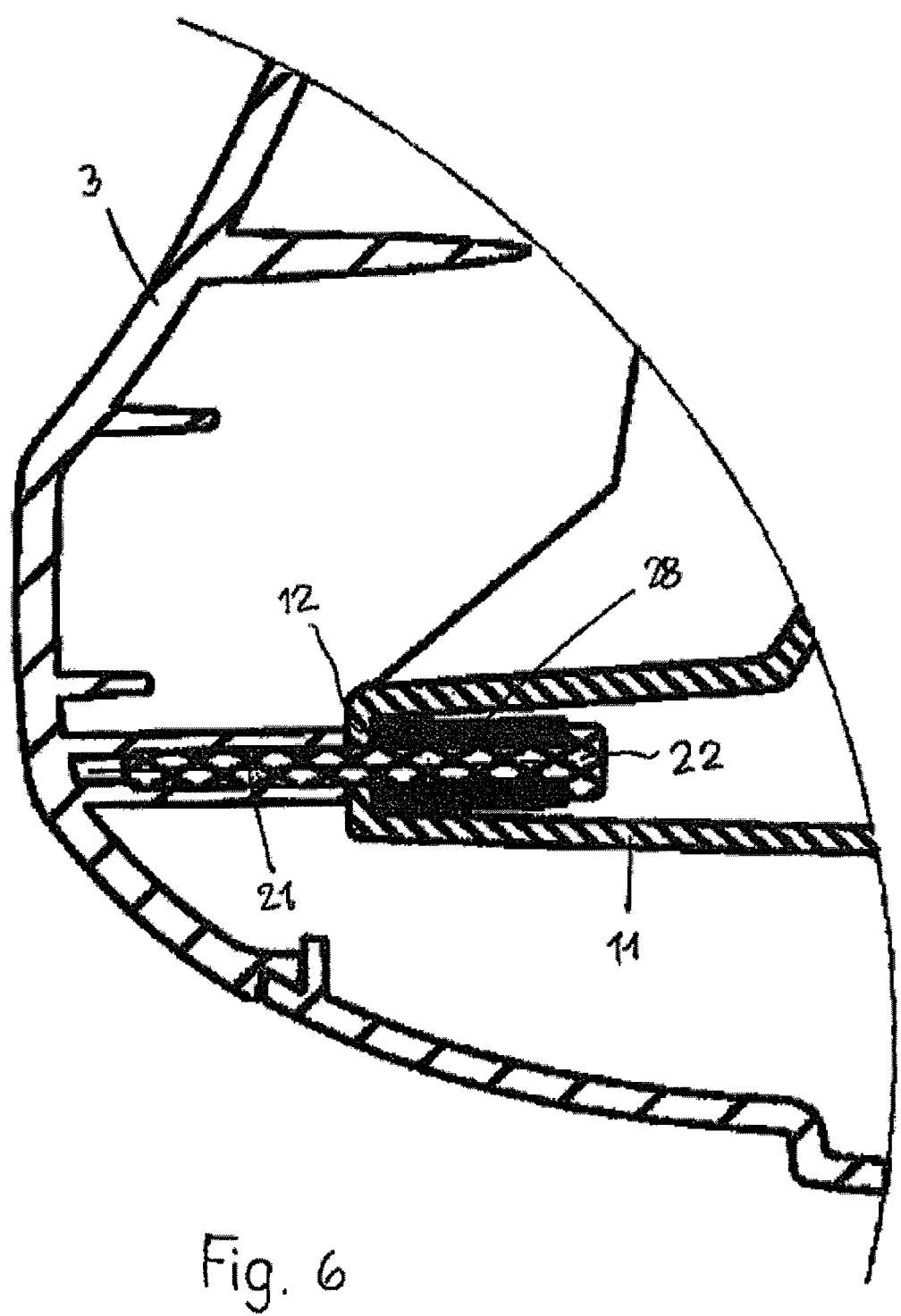
FIG. 6 and FIG. 7 further embodiments of mirror heads according to the invention in illustrations according to FIG. 3.

FIG. 6 shows an embodiment, which largely corresponds to the embodiment according to FIG. 3. The difference is, that instead of the pressure spring, an elastically deformable sleeve 28 sits on the screw 21. The sleeve 28 extends between the bottom 12 of the holder component 11 and the screw head 22. The sleeve 28 is elastically compressed by the screw head 22 during an evasive movement of the mirror housing 3. As soon as the force impacts terminates, the sleeve 28 returns into its original position, whereby the mirror housing 3 returns into its initial position by means of the screw 21.

Figure 7:
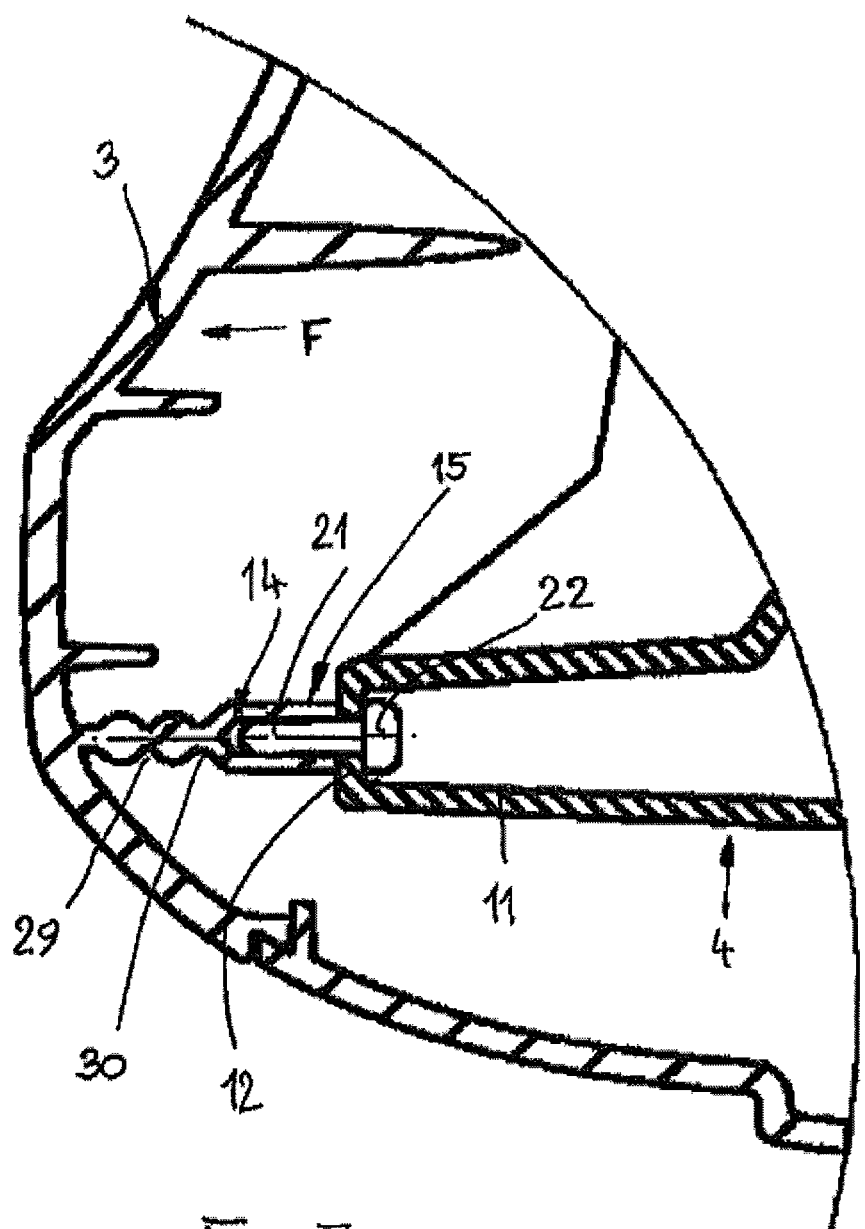

In the embodiment according to FIG. 7 the protrusion 14 of the mirror housing 3 is provided through its shape, so that it can be elastically bent in a particularly simple manner. The protrusion 14 has two exemplary circumferential contractions 29, 30, which provide the protrusion 14 with a high elastic deformability. The protrusion 14 is provided hollow in its end portion, into which the screw 21 is screwed. Different from the embodiments according to FIGS. 3 and 6, the screw 21 abuts to the bottom 12 within the holder component 11 at its head 22. The protrusion 14 abuts to the exterior side of the bottom 12 with its front face. When a force F impacts the mirror housing 3, at least the portion of the mirror housing 3, located in a section above the mounting point 15 can recede elastically through the elastic deformation of the protrusion 14. The contractions 29, 30 assure that the mirror housing 3 can be elastically deformed reliably, relative to the mirror support 4.

The described layout of the protrusion 14 allows, to provide the mirror housing 3 itself with a stiff shape. In this case, the mirror housing 3 pivots through elastic deformation of the protrusion 14 in the area of the contractions 29, 30, relative to the mirror support 4.

In the described embodiment, the mirror housing 3 is connected to the mirror support 4 by at least one respective flexible connection in the mounting area 15. This flexible connection leads to a decoupling between the mirror housing 3 and the mirror support 4 during vibration excitations, which can be caused e.g. by wind forces. Hereby, a simple engineering design of the mirror head 2 is provided. The described embodiments facilitate in particular a cost-efficient manufacture and assembly.

What is claimed is:

1. An exterior rearview mirror of a vehicle comprising:
a mirror support having at least one mounting point;
a mirror housing including a mounting component, protruding from its rear wall in the area of the mounting point, wherein the mounting component is configured to receive at least one screw, which can be screwed into the front side of the mounting component of the mirror housing, wherein the mirror housing has at least one degree of freedom for its movement relative to the mirror support.

2. An exterior rearview mirror according to claim 1, wherein the mounting component is a protrusion protruding in a lateral direction from the inside of the rear wall of the mirror housing.

3. An exterior rearview mirror according to claim 1, wherein the mounting component can be bent in an elastic manner.

4. An exterior rearview mirror according to claim 1, wherein the screw is disposed in a mounting component of the mirror support.

5. An exterior rearview mirror according to claim 1, wherein the mounting component on the mirror support side comprises a bottom with a pass-through opening for the screw at its end facing the rear wall of the mirror housing.

6. An exterior rearview mirror according to claim 1, wherein the screw contacts the bottom of mounting component on the mirror support side with its head.

7. An exterior rearview mirror according to claim 1, wherein the screw includes a head spaced apart from the bottom of mounting component on the mirror support side, and the screw is surrounded by at least one preload element in the area between its head and the bottom.

8. An exterior rearview mirror according to claim 1, wherein the preload element is a compression coil spring.

9. An exterior rearview mirror according to claim 1, wherein the preload element is an elastically deformable sleeve.

\* \* \* \* \*